(12) United States Patent
Toye (10) Patent No.: US 11,231,086 B2
(45) Date of Patent: Jan. 25, 2022

(54) SHEET FASTENING AND ANCHORING COMPONENT

(71) Applicant: Nine IP Limited, Auckland (NZ)

(72) Inventor: Jonathan Dallas Toye, Auckland (NZ)

(73) Assignee: NINE IP LIMITED, Auckland (NZ)

( * ) Notice: Subject to any disclaimer, the term of this patent is extended or adjusted under 35 U.S.C. 154(b) by 0 days.

(21) Appl. No.: 16/615,101

(22) PCT Filed: May 21, 2018

(86) PCT No.: PCT/IB2018/053550
§ 371 (c)(1),
(2) Date: Nov. 19, 2019

(87) PCT Pub. No.: WO2018/220468
PCT Pub. Date: Dec. 6, 2018

(65) Prior Publication Data
US 2020/0103001 A1    Apr. 2, 2020

(30) Foreign Application Priority Data
Jun. 1, 2017 (NZ) .......................... 732430

(51) Int. Cl.
*F16G 11/10* (2006.01)
*A01D 46/00* (2006.01)

(52) U.S. Cl.
CPC .............. *F16G 11/10* (2013.01); *A01D 46/00* (2013.01)

(58) Field of Classification Search
CPC . A01G 13/0293; A01G 13/0268; F16G 11/10; A01D 46/00
See application file for complete search history.

(56) References Cited

U.S. PATENT DOCUMENTS

| 621,190 | A | * | 3/1899 | Weiss et al. ....... A44B 13/0011 |
| | | | | 24/359 |
| 2,900,692 | A | * | 8/1959 | Lincoln .................... G09F 3/12 |
| | | | | 24/710.9 |
| D258,138 | S | * | 2/1981 | Wood ............................. D8/370 |
| 4,825,600 | A | | 5/1989 | Osgood, Sr. |
| 5,379,558 | A | | 1/1995 | Mason, III |
| 6,122,806 | A | * | 9/2000 | Umezawa ............ B60N 2/5825 |
| | | | | 24/546 |
| 6,823,565 | B2 | * | 11/2004 | Toye .................. A01G 13/0293 |
| | | | | 24/265 H |
| D679,095 | S | * | 4/2013 | Williams ....................... D3/328 |

(Continued)

FOREIGN PATENT DOCUMENTS

| JP | 55-60759 A | 5/1980 |
| JP | 6-343355 A | 12/1994 |

(Continued)

*Primary Examiner* — Robert Sandy
*Assistant Examiner* — Louis A Mercado
(74) *Attorney, Agent, or Firm* — Seed IP Law Group LLP (57) ABSTRACT

An improved agricultural sheeting fastening component for use in anchoring agricultural sheet material includes two arms, each including one or more prongs having a tip adapted to pierce the sheet material to connect the fastening component to the sheet material, wherein a terminating portion of the prong(s) extends in a direction away from a junction of the prong to the arm and at an angle between the arm and the terminating portion of the prong of between about −25 and about 45 degrees.

15 Claims, 8 Drawing Sheets

(56) References Cited

U.S. PATENT DOCUMENTS

| | | | |
|---|---|---|---|
| D753,541 S * | 4/2016 | Fung | D11/209 |
| 10,136,588 B2 * | 11/2018 | Toye | A01G 13/0268 |
| 10,167,605 B2 * | 1/2019 | Butterworth | A45F 3/44 |
| 10,472,851 B1 * | 11/2019 | Brislin | E04H 17/08 |
| 2003/0101546 A1 | 6/2003 | Toye | |

FOREIGN PATENT DOCUMENTS

| | | |
|---|---|---|
| KR | 10-0618939 | 8/2006 |
| KR | 20-2015-0000424 U | 1/2015 |

* cited by examiner

SHEET FASTENING AND ANCHORING COMPONENT

FIELD OF INVENTION

The invention relates to a fastening component, particularly but not solely for use in anchoring agricultural sheeting, which may be woven or non-woven or film sheeting or sheet material, to a support.

BACKGROUND TO INVENTION

Commonly ground cover materials used in association with agricultural crops are secured in place on the ground by placing weights on top of the material, such as soil, stones or rocks, lengths of wood or timber, bags filled with sand or soil and/or plastic containers filled with water, along the edges of the material or in discrete piles. Other forms of fasteners penetrate the material and extend into the soil below, such as U-shaped wire staples, plastic pins and wire nails or pins.

U.S. Pat. No. 6,823,565 relates to a fastening component and system for use in anchoring agricultural sheet material to a support or supports. The fastening component includes one or more prongs to engage the sheet material, enabling a length of resiliently extensible and/or inextensible material to be attached to the component and to the support.

SUMMARY OF INVENTION

In broad terms the invention comprises a fastening component capable of connecting a length of elongate resiliently extensible flexible material to a section of agricultural sheet material under tension stretching the resiliently extensible material in anchoring the sheet material to a support, the fastening component including two arms, each arm including one or more prongs having a tip adapted to pierce the sheet material to connect the fastening component to the sheet material, wherein a terminating portion of the prong(s) extends in a direction away from a junction of the prong to the arm and at an angle between the arm and the terminating portion of the prong of between about −25 and about 45 degrees.

In other forms of the invention the terminating portion of the prong(s) extends in a direction away from a junction of the prong to the arm and at an angle between the arm and the terminating portion of the prong of between about −5 and about 45 degrees, or between about +5 and about 45 degrees, or between about −5 and about 30 degrees.

Preferably the prongs each comprise a first prong portion between a bend at a junction of the prong to the arm and a bend intermediate of the length of the prong, and a second prong portion between the bend intermediate of the length of the prong and the end of the prong. The bend at a junction of the prong to the arm is preferably at an angle more acute than the bend intermediate of the length of the prong, and the first prong portion is preferably longer than the second prong portion. Each of the arms is preferably of substantially the same length.

In another form of the invention at least a major part of the prongs is curved towards the arms.

Preferably the ends of the prongs terminate closer to a longitudinal axis of the fastening component between the arms than are the junctions of the prongs to the arms. The ends of the prongs also can comprise an angled end face defining a tip.

Preferably the arms are joined at an attachment eye having an entry to the attachment eye defined between two intermediate portions of the two arms. The two arms may also be resiliently movable at least one away from the other when a hook or loop on one end of said length of resiliently extensible material or a length of inextensible material is manually pulled through said entry and into the eye to connect the hook or loop to the fastening component.

Preferably the fastening component comprises an angle intermediate of the length of the part of the fastening component comprising the arms and attachment eye which directs the attachment eye away from the prongs at an acute angle to the arms of the fastening component. The acute angle may be above about 120 degrees or above about 135 degrees or above about 150 degrees or be about 160 degrees, for example.

Preferably the component is formed from a length of wire, each end of which forms a prong of the component. The ends of the length of wire can be cut at an angle to define tips of the prongs.

In another form the invention comprises a fastening component in combination with a length of resiliently extensible material, arranged to be releasably attached at the other end to the support. Preferably the length of resiliently extensible material is provided with a loop at one or both ends. It is also preferably cord formed of rubber or a synthetic elastic material.

In this specification 'comprising' means 'consisting at least in part of'. When interpreting each statement in this specification that includes the term "comprising", features other than that or those prefaced by the term may also be present. Related terms such as "comprise" and "comprises" are to be interpreted in the same manner.

BRIEF DESCRIPTION OF THE DRAWINGS

The invention is further described with reference to the accompanying figures by way of example wherein.

DETAILED DESCRIPTION

Figure 1A:
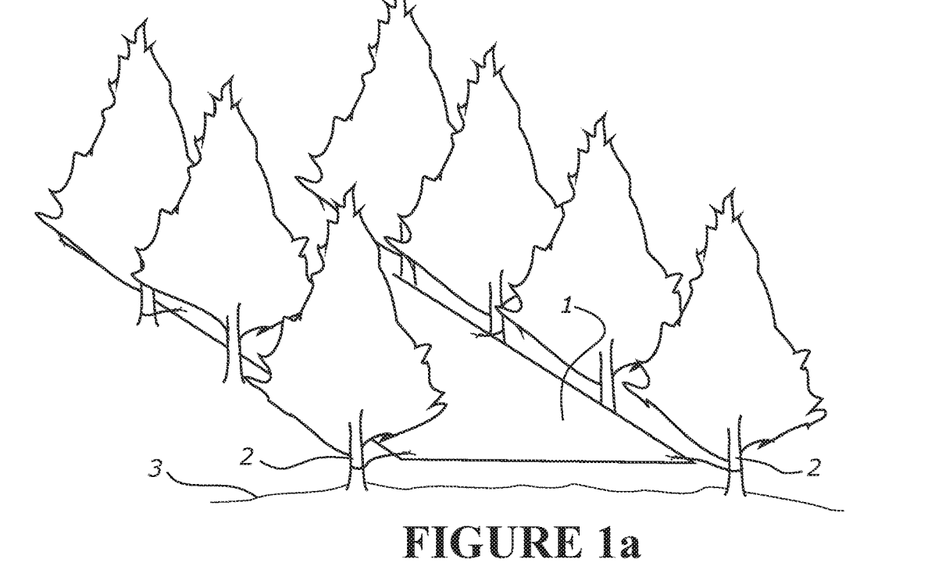
FIGS. 1a and 1b show a fastening component of the invention in use.

FIG. 1a illustrates one preferred use of the invention. Agricultural sheeting 1 which may be a woven or non-woven or knitted material or a film for example, is shown anchored underneath agricultural crops 2. The material may have light reflective properties. The material could be anchored along a crop row and the fasteners could be positioned around the base of each trunk or vine as a support. Typically, as shown in FIG. 1b, the fastening components 4 attach to the sheet material 1 as opposing pairs.

The fastening component, with a length of resiliently extensible and/or inextensible material, that is fastened to the sheeting, which may be for example a woven material or a film, could be attached to the support or supports, for example between 10 mm and 500 mm and preferably between 100 mm and 200 mm, above the ground surface 3. Alternatively the fastening component, with a length of resiliently extensible and/or inextensible material, that is fastened to the sheeting, could be attached to the support or supports at the ground surface or could be suspended above the crops if the sheeting needs to above the crop to impart its benefits such as to provide shade, light transmission properties, wind cover or protection from pests.

The preferred form fastening component of the invention is arranged to anchor the agricultural sheeting 1 to a suitable support. The support could comprise a branch or trunk of a tree 2 or vine crop. Alternatively, the support could comprise a suitable stake, peg, post or pole or a wire tensioned along a crop row.

Figures 1B, 2:
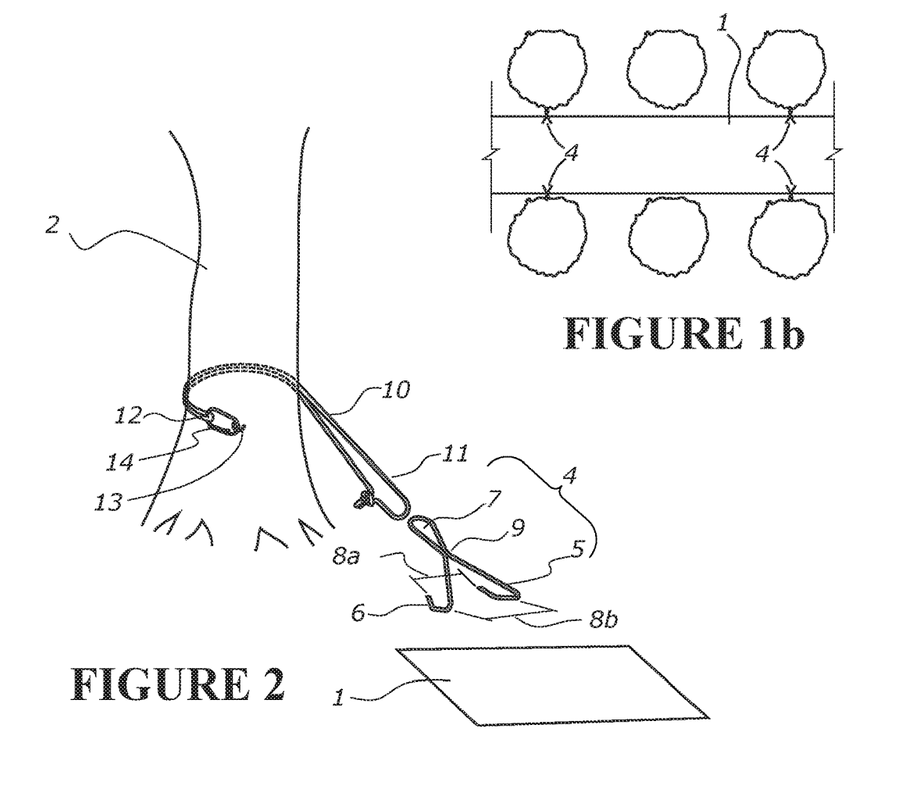
FIG. 2 shows a preferred form fastening component and attachment cord.

A preferred form fastening component 4 is shown in FIG. 2. The fastening component 4 includes two prongs 5 and 6, which are arranged to pierce the sheet material 1. Typically the prongs 5 and 6 can be simply forced through the material. In a preferred form the fastening component 4 is formed from a length of wire and the ends of the wire are shaped to form the prongs 5 and 6. Successive lengths of wire could be cut at an angle to provide the prongs with sharp points to assist in piercing the sheet material 1.

As shown in FIG. 2, the length of wire is preferably bent intermediate of its length to form two arms, each arm terminating in one of prongs 5 and 6. Each of the arms is bent back on itself at greater than a right angle to form the prongs, thereby reducing accidental disengagement of the prongs from the sheet material 1. Each arm is of substantially equal length. The shape of the arms and prongs are designed to anchor the sheet material securely and yet be fastened to and unfastened from the sheeting easily.

The prongs have a terminating portion or tip. The terminating portion of the prong(s) extends in a direction away from a junction of the prong to the arm and at an angle between the arm and the terminating portion of the prong of between about −5 and about 45 degrees, or between about −5 and about 45 degrees, or between about −5 and about 30 degrees, for example.

In a preferred form extensible or inextensible material 10 such as a cord formed of rubber or a synthetic elastic material, can be releasably fastened at one end 11 to the eye 7 of the fastening component 4 and releasably fastened at the other end 12 to a clip 14, that is secured to the support 2 by a staple 13. The loop is preferably formed by doubling a length of cord 10 back on itself and knotting it to form a loop.

The arms of the fastening component 4 are preferably tensioned towards each other to close the eye 7. One end 11 of the cord 10 is passed over one of prongs 5 or 6 and pulled between the arms through point 9 and into the eye 7. As the arms are tensioned toward each other at point 9, the loop 11 is retained within eye 7.

Figure 3:
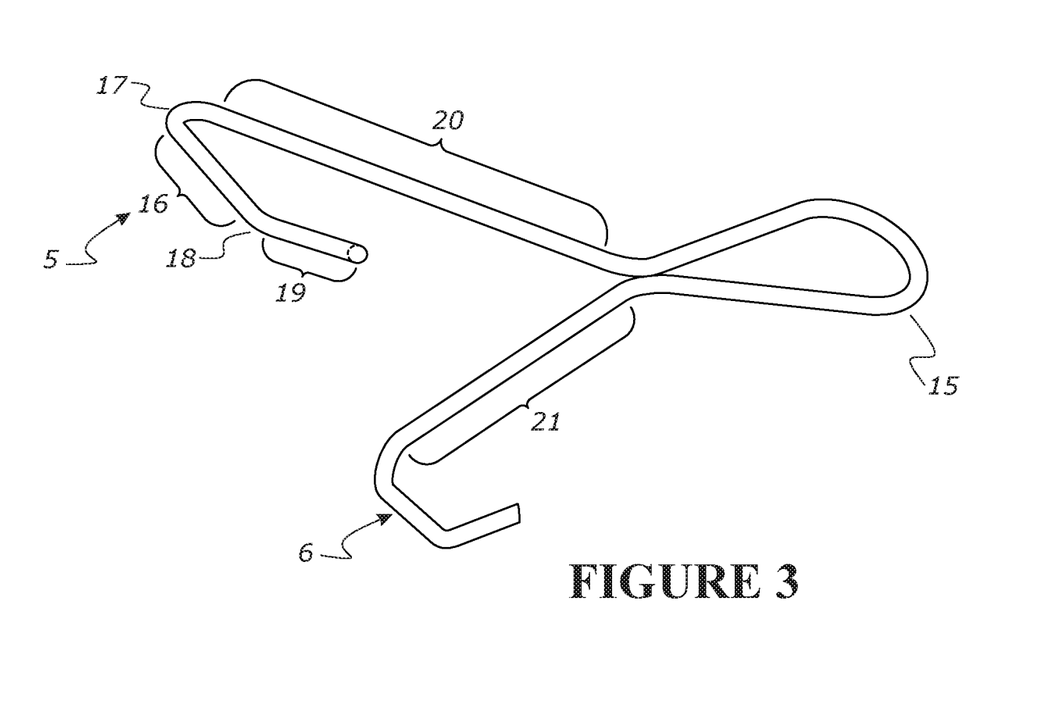
FIG. 3 shows a perspective view of a preferred form fastening component.
Figure 4:
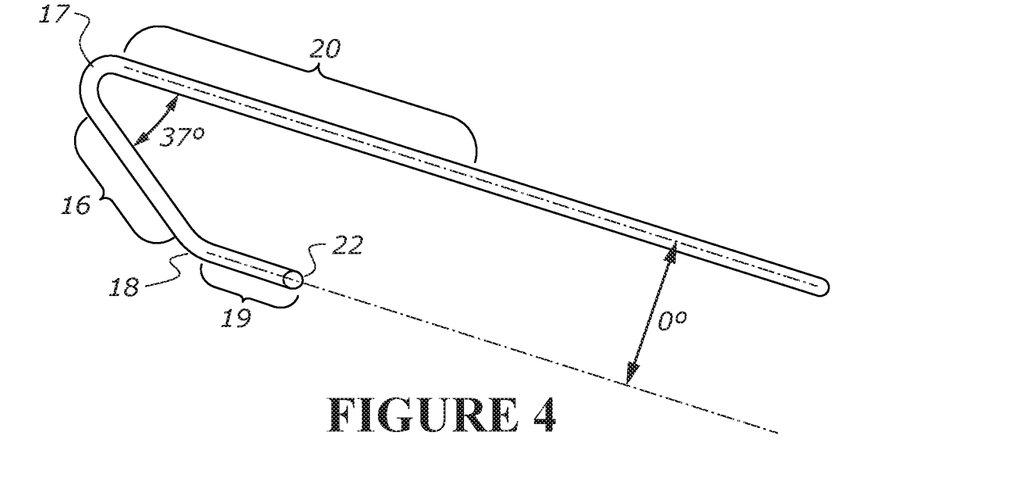
FIG. 4 shows the fastening component from one side.

As shown in FIGS. 3 and 4 the one or more prongs each have a first prong portion 16 which is formed between a first bend at a first junction 17 with the arm, and a second bend at a second junction 18 intermediate of the length of the prong. This preferably forms a second prong portion 19, also referred to herein as a terminating portion. The bend formed at the first junction 17 is preferably more acute than the bend intermediate of the length of the prong formed at the second junction 18.

The first prong portion is preferably of a greater length than the second prong portion. Alternatively, the first prong portion 16 may be shorter or the same length as the second prong portion 19. In other embodiments the prongs may comprise more than two prong portions e.g., three prong portions, which are each formed from further corresponding bends in the prong intermediate the length of the prong, and these prong portions may have different lengths.

Figure 8:
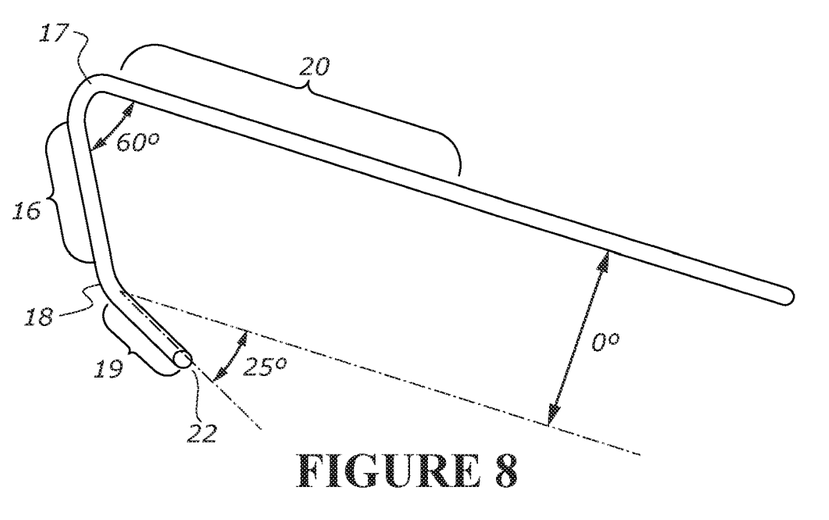
FIG. 8 is a view similar to FIG. 4 but of a further embodiment of the fastening component.
Figure 9:
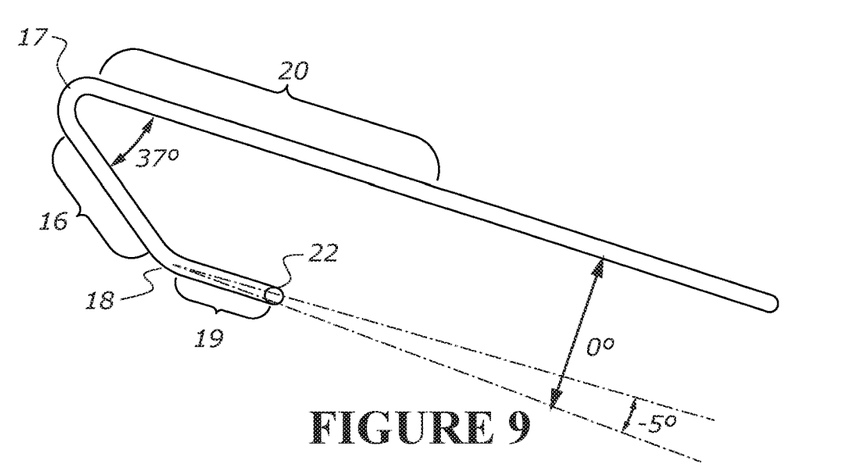
FIG. 9 is a view similar to FIG. 4 but of a further embodiment of the fastening component.

The terminating portion of the prong(s) extends in a direction away from junction 18 of the prong to the arm, and at an angle between the arm 20 and the terminating portion 19 of the prong of between about −5 and about 60 degrees. In the embodiment of FIGS. 1 to 7 the angle is about 0 degrees as shown on FIG. 3. Thus in this embodiment the terminating portions 19 of the prongs are about parallel with the arms 20 and 21. FIG. 8 is a view of another embodiment in which the angle between the terminating portions 19 of the prongs and the arms 20 and 21 is about 25 degrees. FIG. 9 is a view of an embodiment in which the terminating portions 19 of the prongs points slightly towards the arms 20 and 21. In this embodiment the angle between the terminating portions 19 of the prongs and the arms 20 and 21 is about referred to as −5 degrees. Alternatively the angle may be between about −5 or 0 or 5 or 10 degrees and about 40 or 35 or 30 or 25 or 20 or 15 degrees.

Figure 10:
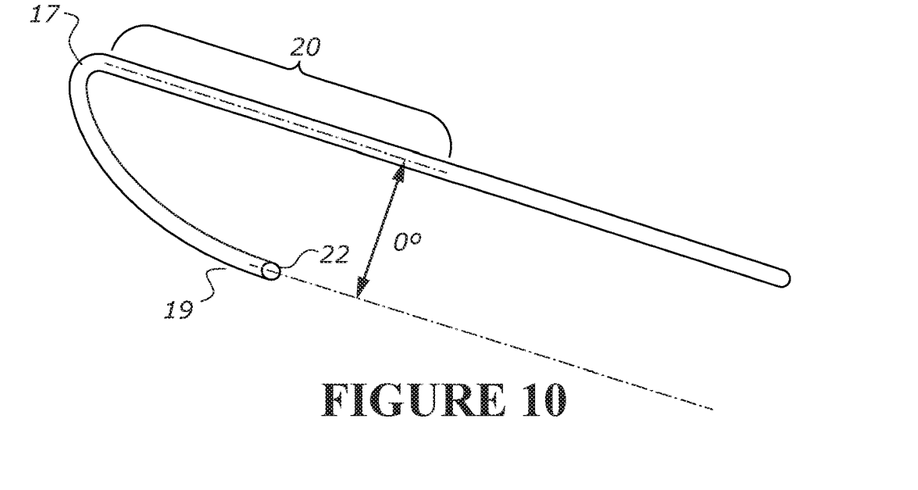
FIG. 10 is a view similar to FIG. 4 but of a further embodiment of the fastening component.

FIG. 10 is a view of another embodiment of the fastening component in which the prongs are formed with a continually curved bend in the arms, from at or towards the junction 17 of the prong to the arm to at or towards the terminating portion 19 of the prong. In the embodiment shown the angle between the terminating portions 19 of the prongs and the arms 20 and 21 is about 0 degrees so that terminating portions 19 of the prongs are about parallel with the arms 20 and 21 as shown.

The prongs are shaped to minimise risk that the prong tip is able to pierce or puncture anything other than the sheet material, and to more securely hold the fastening component in the sheet material. In some instances a prong which features a single prong length may puncture tires if run over by a tractor or traffic which moves over a fastening component in a resting position, for example when not in use and laying on a surface with the prongs facing upward. In the preferred embodiment the prong is formed from a portion of the arm bent back on itself at an angle such that when pressure is applied on the prong in the direction of the arm, the prong will bend so as to move towards the arm, and the sharpened prong tip will be forced downwards towards the arm rather than stick upright into a tire.

Figure 6A:
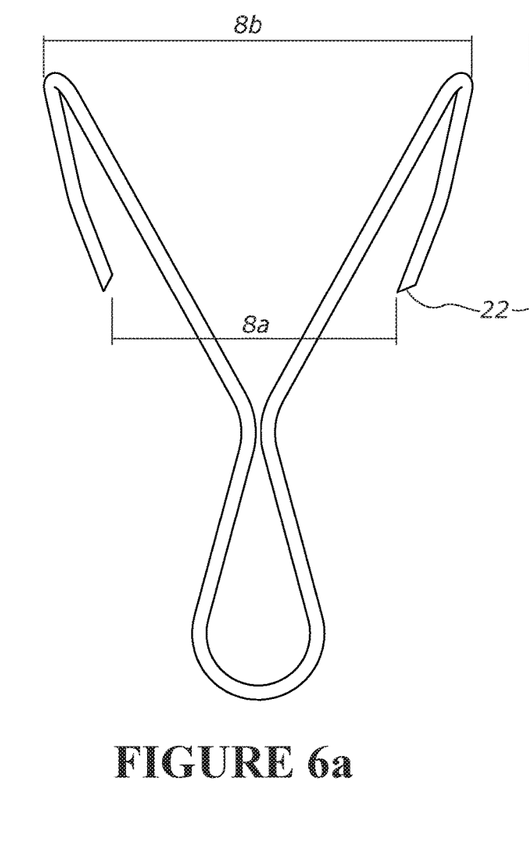
FIGS. 6a and 6b show two different preferred forms of the fastening component from above, with different orientations of the cut face of the terminating portion.
Figure 6B:
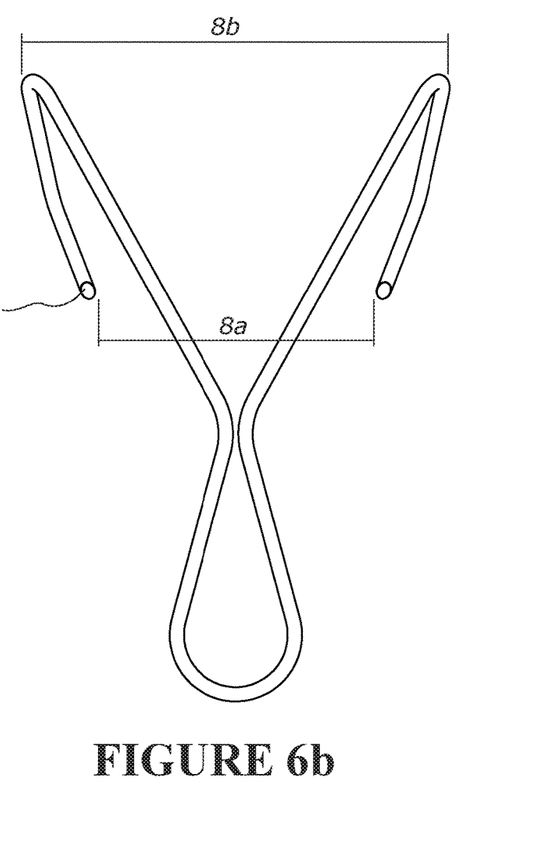

As shown, the tips of the prongs preferably comprise an angled end face. Where formed of wire, the wire may be cut at an angle to form the angled end face 22. The cuts are preferably uniform and the same on each prong. As shown in FIG. 6a, in one embodiment the cut is made such that the angled end face defines a tip which is on the same side of each terminating portion, such that the end faces 22 of each terminating portion both face to one side. In other words, the angled end faces of each prong are similarly oriented. Alternatively the angled end faces of each prong may be oppositely oriented. In the embodiment of FIG. 6b the cut is made such that the angled end face defines a tip which is maximally spaced from the arm of the fastening component. In effect the existing length of the arm which terminates in the tip is preferably spaced maximally from the arm of the fastening component. A shortened length formed by the cut preferably faces toward the arm.

The fastening component 4 is also provided with attachment means enabling a length of material to be attached to the component 4 to fix the component to a support. One form of attachment means is shown as an eye 7. Each of the arms of the fastening component is preferably cranked away from the other and then towards the other arm part way along the length of each arm as shown to form the attachment eye 7.

Figure 5:
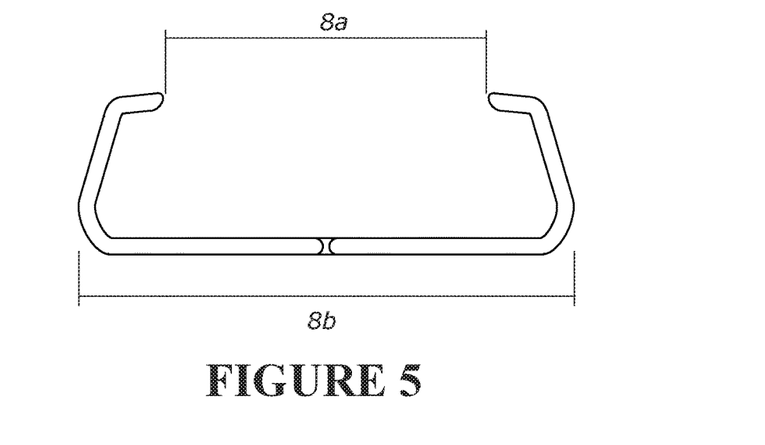
FIG. 5 shows the fastening component from one end.
Figure 7A:
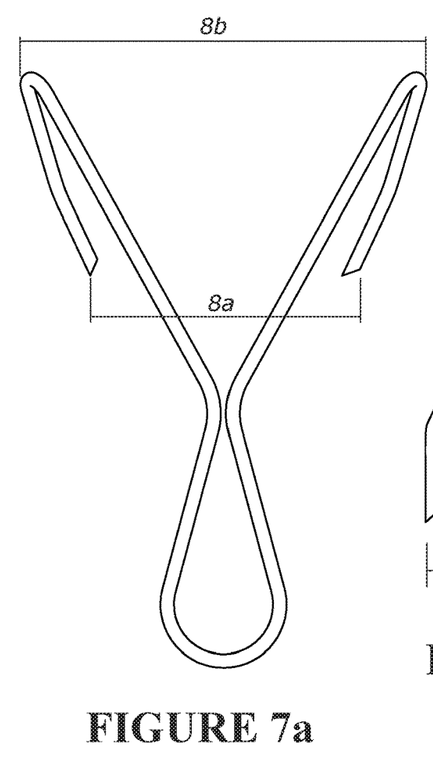
FIGS. 7a, 7b, and 7c show different forms of the fasting component from above, wherein the distance between the prong tips is less than, equal to, or greater than the distance between each arm/prong junction.
Figure 7B:
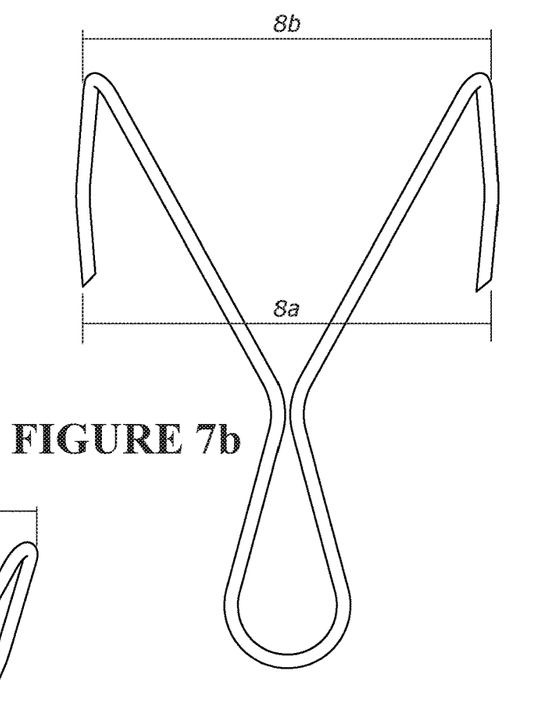
Figure 7C:
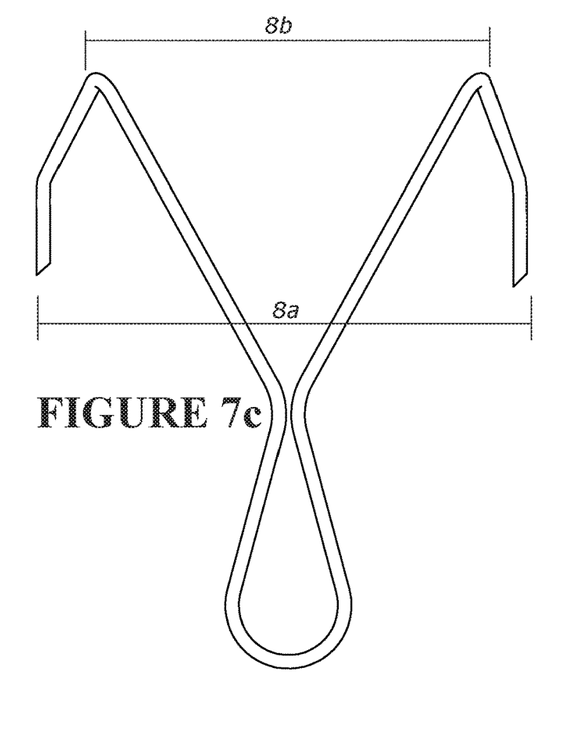

As shown in FIGS. 5 and 6, the distance between the prong tips as indicated at 8a is preferably less than the distance between each arm/prong junction as indicated at 8b. This has the effect of tensioning the prongs together with the sheet material when the prongs are inserted into the material to help prevent unintended withdrawal in the field. As shown in FIG. 7a the distance between the prong tips 8a could be even less than the distance between each arm/prong junction 8b. Alternatively, as is shown in FIG. 7b, the distance between the prong tips as indicated at 8a could be equal to 8b, or as shown in FIG. 7c the distance between the prong tips as indicated at 8a could be greater than the distance between each arm/prong junction as indicated at 8b.

Figure 11:
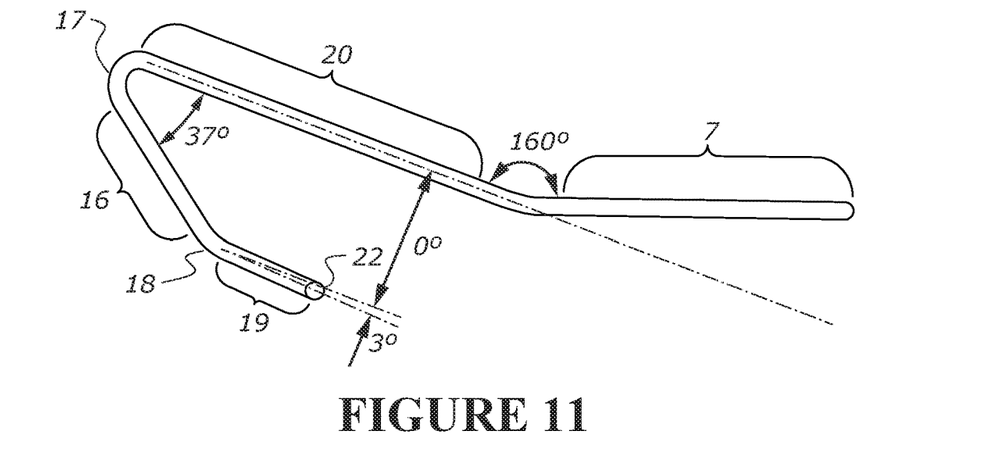
FIG. 11 is a view similar to FIG. 4 but of a further embodiment of the fastening component.
Figure 12:
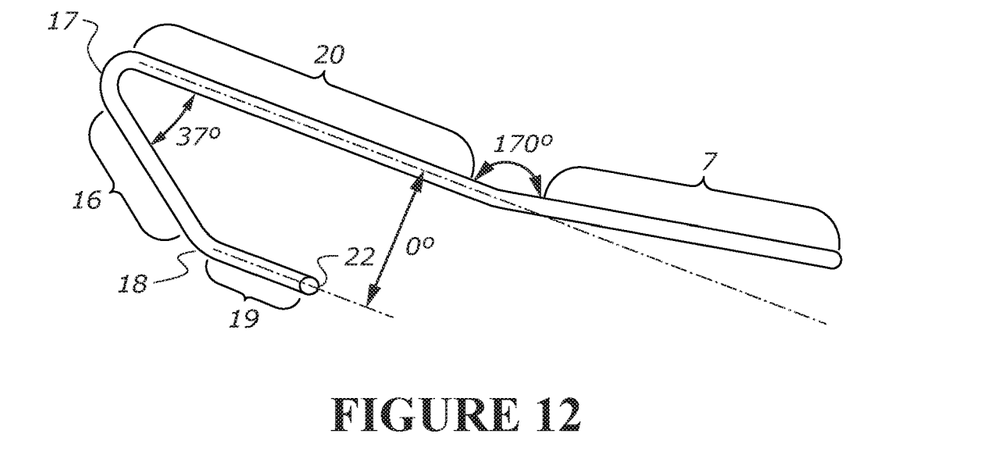
FIG. 12 is a view similar to FIG. 4 but of a further embodiment of the fastening component.
Figure 13:
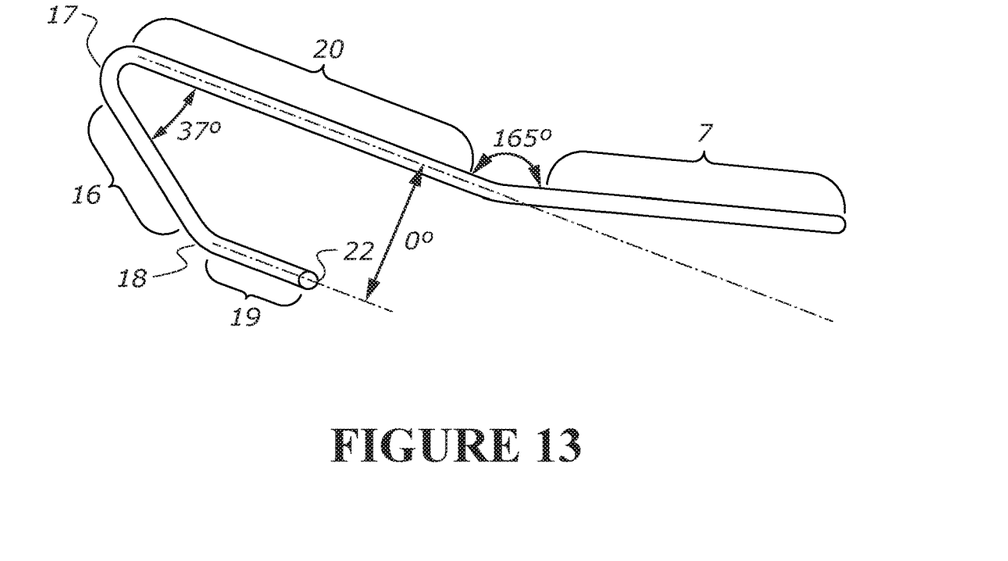
FIG. 13 is a view similar to FIG. 4 but of a further embodiment of the fastening component.

FIGS. 11 to 13 are views of further embodiments of the fastening component in which there is a bend intermediate of the length of the part of the fastening component comprising the arm 20 and attachment eye 7 which directs the attachment eye 7 away from the prongs, at an acute angle to the arms 20 of the fastening component. The bend may be approximately at a junction between the arm 20 and attachment eye 7 as shown. The bend assists in making the insertion of the prongs into the sheet material occur with greater ease. The attachment eye 7 forms a handle with a slight upward angle, which can be held to pull the claw and insert the claw prongs into the sheet material. Also in this embodiment, if the claw is on the ground with the prongs facing upwards and is driven over, a wheel making contact first with part 7 of the claw will flatten the body part of the claw comprising the arm 20 and eye 7, which will also reduce the upward angle of the prongs relative to the ground, reducing their likelihood of the prongs penetrating the vehicle tire. In the embodiment of FIG. 11 the bend between the arm 20 and attachment eye 7 positions the attachment eye 7 at an angle of about 160 degrees to the arms 20 of the fastening component. In the embodiment of FIG. 12 the bend between the arm 20 and attachment eye 7 positions the attachment eye 7 at an angle of about 170 degrees to the arms 20 of the fastening component. In the embodiment of FIG. 13 the bend between the arm 20 and attachment eye 7 positions the attachment eye 7 at an angle of about 165 degrees to the arms 20 of the fastening component. In embodiments in which there is such a bend between the arm 20 and attachment eye 7 the bend angle may be above about 135 degrees or above about 150 degrees or above 160 degrees, for example.

Figure 14:
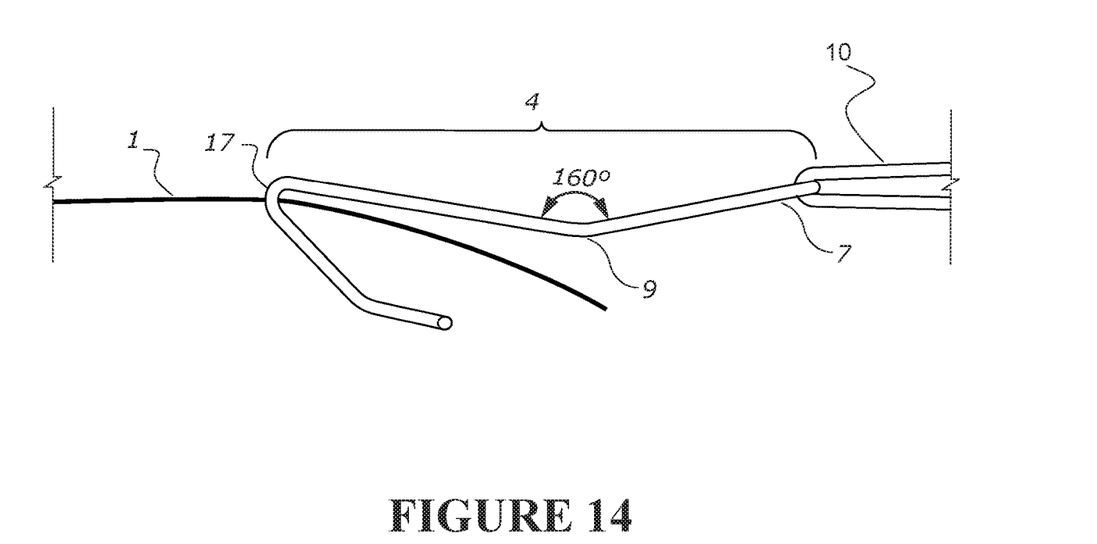
FIG. 14 shows a preferred form of the fastening component held horizontally between sheeting and a length of cord.

FIG. 14 shows a preferred embodiment of the fastening component 4 attached to the edge of the sheet material 1 at one end and to a cord 10 on the other. The u-shaped end of the fastening component attached through the sheet material helps to hold the sheet material securely in place.

Figure 15A:
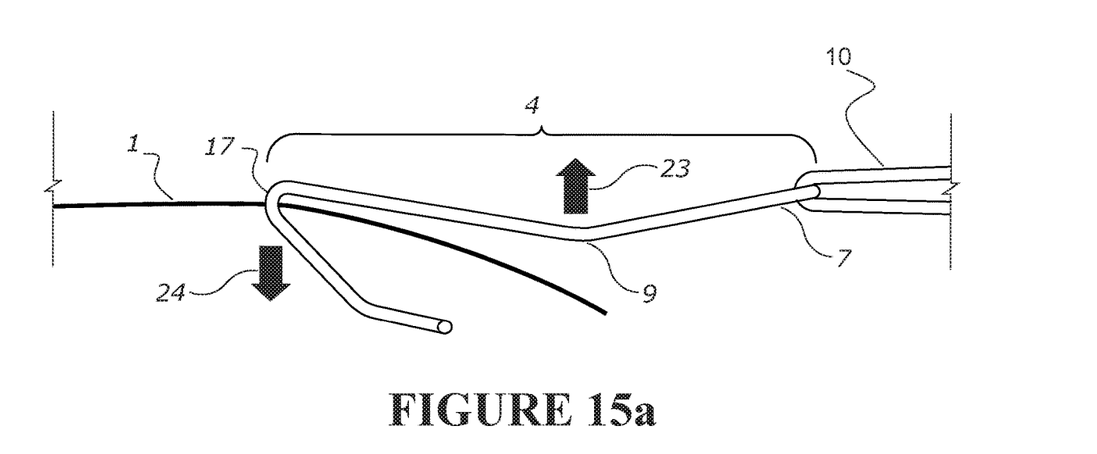
FIGS. 15a and 15b show different forces acting upon the fastening component and the sheeting that help keep the fastening component secured in the sheet material.
Figure 15B:
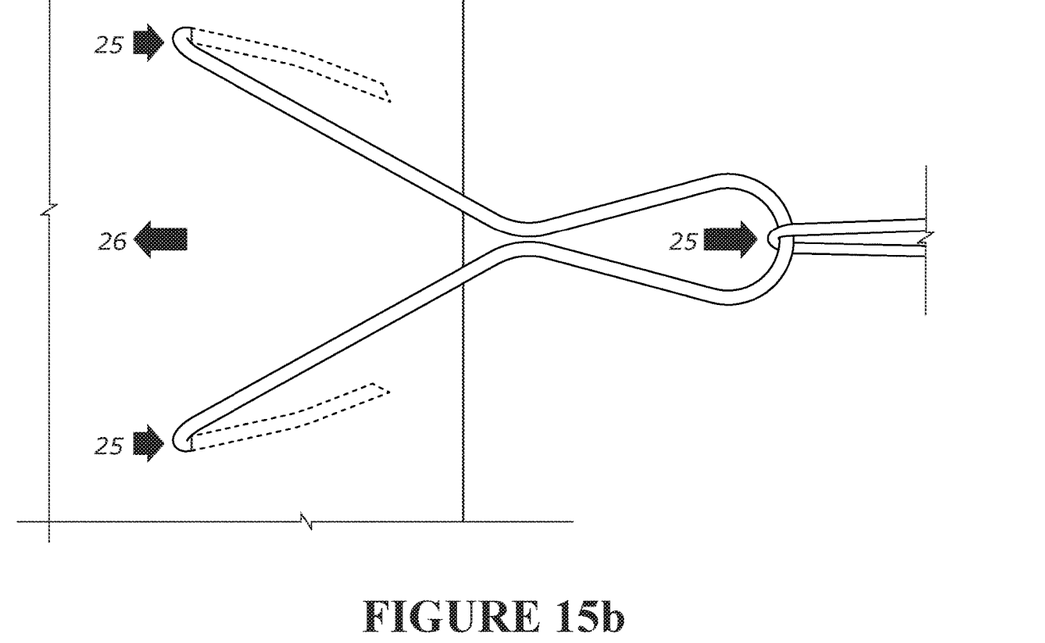

As shown in FIGS. 15a and 15b, when the fastening component 4 is attached to a cord 10 and the sheet material 1 and subject to force in an approximately horizontal plane as indicated in FIG. 15b, the bend in the fastening component 9 will also provide the fastening component with spring force tension 23 in the vertical plane which further helps to hold the fastening component in the sheet material by forcing the claws penetrating the sheet material downwards 24 into the material. There is also a force in the horizontal plane 25 as the fastening component 4 is pulled away from the sheet material 1 by the cord 10. This is matched by an opposing force 26 generated by the fastening component on the opposite side of the material, with each pair of fastening components acting together to hold the sheet material 1. This helps to keep the fastening component 4 securely positioned in the sheet material 1.

Figure 16:
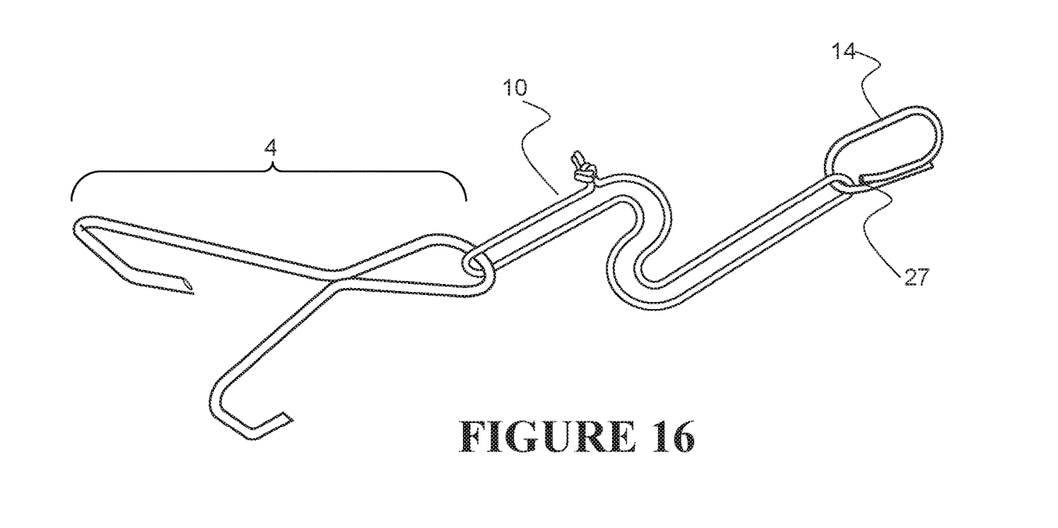
FIG. 16 shows the fastening component of FIGS. 1 to 6 and a clip connected by a length of cord.

As shown in FIG. 16, the one end of cord 10 may be connected to a clip 14 by pulling the cord 10 through the entry aperture 27 and into the clip 14. As shown in FIG. 1 the clip 14 may be secured to support 2 with a staple 13 or other suitable fastener for example a nail or spike or by a length of twine tied around the support. The clip 14 is formed from a length of stiff wire bent to form a closed loop. Alternatively the clip could be moulded or cast from a plastics material.

The preferred eye 7 is substantially tear drop in shape. It will be appreciated that the shape of the eye could be varied, for example to the attachment eye 7 could be substantially triangular or substantially quadrilateral in shape so that loop 11 is retained in the eye 7 at point 15, thereby reducing lateral movement of the loop 11 with respect to the fastening component 4. The preferred fastening component is arranged so that the component is easily and quickly engageable and disengageable with material 1, the cord 10 is easily and quickly engageable and disengageable with the component, and the cord is easily and quickly engageable and disengageable with support 2. The fastening system of the invention combining clips, cords and fastening component 4 allows quick and easy fastening and unfastening of the sheeting 1 so that it may be put in place and then subsequently removed and replaced or moved to another area of land. When the material 1 is used as ground cover, this allows the material 1 to be removed from the component 4 and/or cord along one side of a row of crops or trees and folded back in the other row, then later unfolded and reattached, or unattached along both sides of the material 1 and removed from the field. Such easy and quick reattachment can be desirable during installation of the sheeting in the spring and removal of the material in the autumn. Easy and quick reattachment is also desirable for time critical activities such as during spring frosts to fold back the material to allow ground heat being held by the sheeting to be more easily released to reduce frost damage, and for crops with multiple harvest picks where it is desirable to have the material in place between picks and where it is desirable to fold back the material at each harvest pick.

It will be appreciated that the fastening component could be formed from a single length of inextensible spring wire or could alternatively be formed from a combination of extensible and inextensible wire materials. The fastening component could also be formed entirely or at least partly of plastic and/or plastic strengthening materials. The plastic or similar synthetic type materials could be formed partly or completely from extensible or inextensible materials or a combination of the above materials.

FIG. 2 also shows a preferred form of cord and a method of attachment to the fastening component. It will be appreciated that cord 10 could be provided with a suitable loop, hook or clip at one or both ends. The cord 10 can be fastened to the fastening component 4, having passed the loop 11 between the arms of the fastening component. The cord 10 could alternatively be threaded through the eye of the fastening component 4 and then pulled tight.

In use, the cord 10 is secured to support 2, for example by driving a staple 13, spike or nail into the support 2. The other end of the cord is attached to the fastening component 4 and the cord 10 is stretched by pulling the fastening component 4 away from the support 2 and connecting the fastening component 4 to the sheeting 1 while the cord 10 is stretched to place the sheeting 1 under tension. Where it is desired to anchor a length of sheeting, it is envisaged that the above step could be repeated to connect successive fastening components 4 and cords 10 along the sheeting 1 to anchor the sheeting 1 to one or more supports 2.

Once the material 1 is fastened, for example, as ground cover, a tractor or similar traffic may be driven over the material 1. The pulling force of the wheels of the traffic pulls on the cover and this force is transferred to the cord, causing the cord to stretch. As the tractor or traffic moves down the row past the tensioned cord, the pulling force is removed and the cord returns to its resting position.

In areas of high wind, the force of the wind tends to lift the sheet material 1. This lifting or pulling force is partly absorbed by the tensioned cord, which acts similarly to a shock absorber. The material 1 lifts on one side due to the wind, and under pressure from the wind and rubber cord or band, the other side of the material then lifts to release the pressure. The material 1 develops a pulsing or wave action along the surface in response to the wind. This pulsing force, which absorbs some of the wind's force, rather than being borne fully on the material and fasteners, gives a more effective and efficient fastening system. In addition, the pulsing or wave action acts as a force to clean soil, leaves or fruit from the surface of the material 1.

It will be appreciated that the material may be used as ground cover, but may also be used as greenhouse or other crop covers, shade cloth, windbreak, bird netting or other uses. The fastening component may be used to fasten this material regardless of the use which is made of the material.

The foregoing describes the invention including preferred forms thereof. Alterations and modifications as will be obvious to those skilled in the art are intended to be incorporated within the scope hereof as defined by the accompanying claims.

The invention claimed is:

1. An agricultural sheeting fastening component capable of connecting a length of elongate resiliently extensible flexible material to a section of agricultural sheet material under tension stretching the resiliently extensible material in anchoring the sheet material to a support, the fastening component including:

an attachment end comprising an attachment eye, and two arms, each arm including one or more prongs at a prongs end of the fastening component, each prong having a tip sufficiently sharp to pierce the sheet material to connect the fastening component to the sheet material, wherein a terminating portion of the prong(s) extends in a direction away from a junction of the prong to the arm and towards the attachment end of the fastening component at an angle between the arm and the terminating portion of the prong of between about −25 and about 45 degrees; and an angle intermediate of a length of a part of the fastening component comprising the arms and the attachment eye which directs the attachment eye away from the prongs at an acute angle to the arms of the fastening component and facilitates use of the attachment eye as a handle during insertion.

2. The fastening component according to claim 1, wherein the terminating portion each of the prong extends in a direction away from the junction of the prong to the arm and towards the attachment end of the fastening component at an angle between the arm and the terminating portion of the prong of a about −5 and about 45 degrees.

3. The fastening component according to claim 1, wherein the terminating portion each of the prong extends in a direction away from the junction of the prong to the arm and towards the attachment end of the fastening component at an angle between the arm and the terminating portion of the prong of about +5 and about 45 degrees.

4. The fastening component according to claim 1, wherein the prongs each comprise a first prong portion between a bend at the junction of the prong to the arm and a bend intermediate of a length of the prong, and a second prong portion between the bend intermediate of the length of the prong and the prong end.

5. The fastening component according to claim 4 wherein the bend at the junction of the prong to the arm is at an angle more acute than the bend intermediate of the length of the prong.

6. The fastening component as claimed in claim 4 wherein the first prong portion is longer than the second prong portion.

7. The fastening component as claimed in claim 1, wherein the prongs end terminate closer to a longitudinal axis of the fastening component between the arms than are the junctions of the prongs to the arms.

8. The fastening component as claimed in claim 1, wherein the end of each of the prong comprises an angled end face defining the tip, and wherein the angled end face of each prong are similarly oriented.

9. The fastening component as claimed in claim 1, wherein the end of each of the prong comprises an angled end face defining a tip, and wherein the angled end face of each prong are oppositely oriented.

10. The fastening component as claimed in claim 1, wherein the arms are joined at the attachment eye, the attachment eye having an entry to the attachment eye defined between two intermediate portions of the two arms.

11. The fastening component as claimed in claim 10 wherein the two arms are resiliently movable at least one away from the other when a hook or loop on one end of a length of resiliently extensible material or a length of inextensible material is manually pulled through said entry and into the attachment eye to connect the hook or the loop to the fastening component.

12. The fastening component as claimed in claim 1 wherein the acute angle is between the arms and the attachment eye.

13. The fastening component as claimed in claim 1 wherein the fastening component is formed from a length of wire, each end of which forms the prong of the fastening component.

14. The fastening component as claimed in claim 13 wherein the ends of the length of the wire are cut at an angle to define tips of the prongs.

15. The fastening component as claimed in claim 1 in combination with a length of resiliently extensible material, arranged to be releasably attached at the attachment end to a support.

* * * * *

UNITED STATES PATENT AND TRADEMARK OFFICE
CERTIFICATE OF CORRECTION

| | |
|---|---|
| PATENT NO. | : 11,231,086 B2 |
| APPLICATION NO. | : 16/615101 |
| DATED | : January 25, 2022 |
| INVENTOR(S) | : Jonathan Dallas Toye |

It is certified that error appears in the above-identified patent and that said Letters Patent is hereby corrected as shown below:

In the Claims

Column 8, Claim 7, Line 41:
"as claimed in claim 1," should read: --as claimed in claim 1--;

Column 8, Claim 8, Line 45:
"as claimed in claim 1," should read: --as claimed in claim 1--;

Column 8, Claim 8, Line 48:
"each prong" should read: --each of the prong--;

Column 8, Claim 9, Line 49:
"as claimed in claim 1," should read: --as claimed in claim 1--;

Column 8, Claim 9, Line 52:
"face defining a tip," should read: --face defining the tip,--;

Column 8, Claim 9, Line 53:
"each prong" should read: --each of the prong--;

Column 8, Claim 10, Line 54:
"as claimed in claim 1," should read: --as claimed in claim 1--.

Signed and Sealed this
Tenth Day of October, 2023

Katherine Kelly Vidal
*Director of the United States Patent and Trademark Office*